(12) United States Patent
Christoffer et al.

(10) Patent No.: US 10,626,928 B2
(45) Date of Patent: Apr. 21, 2020

(54) ASSEMBLY FOR A SYNCHRONIZATION UNIT OF A VARIABLE RATIO GEAR TRANSMISSION

(71) Applicant: OERLIKON FRICTION SYSTEMS (GERMANY) GMBH, Bremen (DE)

(72) Inventors: Ulf Christoffer, Bremen (DE); Ralf Frede, Freissenbuettel (DE); Marcus Spreckels, Oyten (DE)

(73) Assignee: OERLIKON FRICTION SYSTEMS (GERMANY) GMBH, Bremen (DE)

( * ) Notice: Subject to any disclaimer, the term of this patent is extended or adjusted under 35 U.S.C. 154(b) by 0 days.

(21) Appl. No.: 15/597,732

(22) Filed: May 17, 2017

(65) Prior Publication Data

US 2017/0350457 A1 Dec. 7, 2017

(30) Foreign Application Priority Data

Jun. 1, 2016 (EP) ..................... 16172494

(51) Int. Cl.
*F16D 23/04* (2006.01)
*F16D 23/02* (2006.01)
*F16D 23/06* (2006.01)

(52) U.S. Cl.
CPC ........... *F16D 23/04* (2013.01); *F16D 23/025* (2013.01); *F16D 2023/0625* (2013.01); *F16D 2023/0681* (2013.01)

(58) Field of Classification Search
None
See application file for complete search history.

(56) References Cited

U.S. PATENT DOCUMENTS

| 1,883,682 A | * | 10/1932 | Gamble | F16D 13/64 |
| | | | | 192/107 R |
| 4,770,283 A | * | 9/1988 | Putz | B21D 53/16 |
| | | | | 192/107 M |

(Continued)

FOREIGN PATENT DOCUMENTS

| DE | 100 55 861 | 1/2002 |
| DE | 10 2007 062 467 | 6/2009 |

(Continued)

OTHER PUBLICATIONS

Machine language translation of Karais DE10-2007062467.*

(Continued)

*Primary Examiner* — Mark A Manley
(74) *Attorney, Agent, or Firm* — Greenblum & Bernstein, P.L.C.

(57) ABSTRACT

Assembly for a synchronization unit of a variable ratio gear transmission. Assembly has a synchronizer ring and a friction ring. The friction ring has a friction surface and an installation surface and the synchronizer ring has a contact surface directed toward the installation surface. To allow a high efficiency of the synchronizing unit and simultaneously a functionally safe and comfortable operation of the variable ratio gear transmission, the synchronizer ring and the friction ring are configured and arranged such that the geometrical shape of the installation surface of the friction ring differs from the geometrical shape of the contact surface of the synchronizer ring in a relief state of a synchronizing process; and that the geometrical shape of the installation surface of the friction ring corresponds to the geometrical shape of the contact surface of the synchronizer ring in a load state of the synchronizing process.

18 Claims, 3 Drawing Sheets

(56) References Cited

U.S. PATENT DOCUMENTS

| | | | |
|---|---|---|---|
| 9,400,019 B2* | 7/2016 | Skipper | F16D 23/025 |
| 2008/0283353 A1* | 11/2008 | Holderied | C22C 9/04 |
| | | | 192/107 M |
| 2013/0333998 A1 | 12/2013 | Skipper et al. | |

FOREIGN PATENT DOCUMENTS

| | | | |
|---|---|---|---|
| EP | 1199489 | * | 10/2000 |
| EP | 1199489 | * | 4/2004 |
| EP | 2 677 187 | | 5/2013 |
| JP | 1-242826 | * | 9/1989 |

OTHER PUBLICATIONS

Machine language translation of EP1199489.*
Europe Search Report/Office Action conducted in Europe Appln. No. 161 72 494.3 (Jan. 2, 2017) (w/ Partial Machine Translation).

* cited by examiner

ASSEMBLY FOR A SYNCHRONIZATION UNIT OF A VARIABLE RATIO GEAR TRANSMISSION

CROSS-REFERENCE TO RELATED APPLICATIONS

The present application claims priority under 35 U.S.C. § 119(a) of European Patent Application No. 161 72 494.3 filed Jun. 1, 2016, the disclosure of which is expressly incorporated by reference herein in its entirety.

BACKGROUND OF THE INVENTION

1. Field of the Invention

The invention relates to an assembly for a synchronization unit of a variable ratio gear transmission. The invention further relates to a method of synchronizing a gear wheel of a variable ratio gear transmission. In addition, the invention relates to a friction ring, to a synchronization unit for a variable ratio gear transmission and to a variable ratio gear transmission.

2. Discussion of Background Information

An assembly for a synchronization unit of a variable ratio gear transmission of a vehicle is described in EP 2 677 187 A1. The assembly has a friction ring which comprises a conical friction ring body having an inner friction surface and an outer installation surface which respectively bound the friction ring body in a peripheral direction extending perpendicular to an axial friction ring axis. The inner friction surface in this respect extends at a predefined friction angle and the outer installation surface extends at a predefined installation angle, in each case conically along the friction ring axis. The assembly additionally has a synchronizer ring having a corresponding contact surface directed toward the outer installation surface of the friction ring. The synchronizer ring and the friction ring are configured and arranged such that the contact surface of the synchronizer ring contacts the outer installation surface of the friction ring and the inner friction surface of the friction ring is in friction contact with a gear wheel during a synchronization process in which the synchronizer ring is displaced in the direction of a gear wheel to be synchronized.

The use of such an assembly in a synchronization unit of a variable ratio gear transmission on the one hand allows a high efficiency, that is a large reinforcement effect between the actuation force and the synchronizing torque and simultaneously a high shifting comfort. This is achieved by the spatial separation of the two functions "generate synchronizing torque" and "release friction pairing" which are combined in one and the frame friction pairing in synchronization units which are based on the so-called Borg-Warner concept. The spatial separation is achieved by the use of an assembly of a friction ring having a friction surface and an installation surface and a synchronizer ring having a contact surface corresponding to the installation surface of the friction ring. The friction surface of the friction ring in this respect produces the synchronizing torque in a force-transmitting manner and a reliable releasing of the force fit takes place at the contact surface and at the installation surface. An independent optimization of the two functions can thus take place with respect to their specific demands.

On the use of the described assembly in a synchronization unit, disturbances of comfort and function may in particular occur at low operating temperatures in the form of a so-called second pressure point or blocked gearshifts may also occur.

SUMMARY OF THE EMBODIMENTS

In light of this, embodiments of the invention provide an assembly for a synchronization unit of a variable ratio gear transmission which allows an operationally secure and comfortable operation of the variable ratio gear transmission.

Accordingly, embodiments are directed to an assembly for a synchronization unit of a variable ratio gear transmission. The assembly includes a friction ring that comprises a conical friction ring body having a friction surface and an installation surface that respectively bound the friction ring body in a peripheral direction extending perpendicular to an axial friction ring axis; and a synchronizer ring having a contact surface directed toward the installation surface of the friction ring. The synchronizer ring and the friction ring are configured and arranged such that the geometrical shape of the installation surface of the friction ring differs from the geometrical shape of the contact surface of the synchronous ring in a relief state of a synchronizing process in which the synchronizer ring is moved away from a gear wheel to be synchronized; and the geometrical shape of the installation surface of the friction ring corresponds to the geometrical shape of the contact surface of the synchronizer ring such that the contact surface of the synchronizer ring contacts the installation surface of the friction ring over its full area and the friction surface of the friction ring is in friction contact with the gear wheel in a load state of the synchronizing process in which the synchronizer ring is displaced in the direction of the gear wheel to be synchronized.

The dependent claims relate to particularly advantageous embodiments of the invention.

The invention thus relates to an assembly for a synchronization unit of a variable ratio gear transmission that comprises a friction ring and a synchronizer ring. The friction ring comprises a conical friction ring body having a friction surface and an installation surface that respectively bound the friction ring body in a peripheral direction extending perpendicular to an axial friction ring axis and the synchronizer ring comprises a contact surface that is directed toward the installation surface of the friction ring.

In accordance with the invention, the synchronizer ring and the friction ring are configured and arranged such that the geometrical shape of the installation surface of the friction ring differs from the geometrical shape of the contact surface of the synchronizer ring in a relief state of a synchronizing process in which the synchronizer ring is moved away from a gear wheel to be synchronized and such that the geometrical shape of the installation surface of the friction ring corresponds to the geometrical shape of the contact surface of the synchronizer ring such that the contact surface of the synchronizer ring contacts the installation surface of the friction ring over its full area and the friction surface of the friction ring is in friction contact with the gear wheel in a relief state of the synchronizing process in which the synchronizer ring is displaced in the direction of the gear wheel to be synchronized.

Within the framework of this invention, the relief state represents the state of the synchronization process in which the synchronizer ring is moved away from the gear wheel to be synchronized. In the relief state, the contact surface of the synchronizer ring and the installation surface of the friction ring are substantially released from one another in the peripheral direction, i.e. the contact surface does not fully contact the installation surface. Conversely, the load state represents the state of the synchronizing process in which the synchronizer ring is displaced in the direction of the gear wheel to be synchronized. In the load state, the friction surface of the friction ring is in friction contact with the gear wheel and in so doing produces a synchronizing torque in a force-transmitting manner. The term "corresponds" within the framework of this application means that the geometrical shape of the installation surface of the friction ring and the geometrical shape of the contact surface of the synchronizer ring are adapted to one another in the load state such that the contact surface of the friction ring contacts the installation surface of the friction ring in the peripheral direction over the full area, i.e. completely, over the total periphery of the friction ring.

Furthermore, within the framework of the invention, the contact surface of the synchronizer ring and/or the installation surface of the friction ring is/are elastically deformable such that the contact surface of the synchronizer ring and/or the installation surface of the friction ring is/are elastically deformed on the transition of the assembly from the relief state into the load state until the geometrical shape of the installation surface of the friction ring corresponds to the geometrical shape of the synchronizer ring. Due to the elastic deformation, the contact surface of the synchronizer ring and/or the installation surface of the friction ring returns/return to its/their original state again on the transition of the assembly from the load state into the relief state such that the geometrical shape of the installation surface of the friction ring and the geometrical shape of the contact surface of the synchronizer ring differ from one another in the relief state. This is unlike the prior art where the geometrical shape of the installation surface of the friction ring does not differ from the geometrical shape of the contact surface of the synchronizer ring in the relief state and the contact surface of the synchronizer ring and/or the installation surface of the friction ring is/are not elastically deformed or preloaded on the transition of the assembly from the relief state into the load state.

Within the framework of the invention, the assembly can be configured such that only the contact surface of the synchronizer ring is elastically deformed, only the installation surface of the friction ring is elastically deformed or the contact surface of the synchronizer ring and the installation surface of the friction ring are elastically deformed together on the transition of the assembly from the relief state into the load state.

It is a substantial advantage of the assembly in accordance with the invention that the adhesion between the installation surface of the friction ring and the contact surface of the synchronizer ring is minimized. A "sticking together" of the friction ring and the synchronizer ring is hereby avoided such that the above-described spatial separation of the functions "generate synchronizing torque" and "release friction pairing" is ensured, in particular also at low operating temperatures at which the viscosity of the transmission oil serving for the lubrication and cooling is relatively high. This allows a particularly high efficiency and at the same time a particularly high shifting comfort.

The minimization of the adhesion is achieved in this respect in that some of the adhesion force is overcome by the restoring force of the contact surface of the synchronizer ring and/or of the installation surface of the friction ring on the transition of the assembly unit from the load state into the relief state. The preload of the contact surface of the synchronizer ring and/or of the installation surface of the friction ring that is built up on the transition into the load state thus supports the release of the installation surface of the friction ring and of the contact surface of the synchronizer ring on the transition of the assembly from the load state into the relief state. Unlike the prior art, a restoring force that is directed counter to the adhesion force thus acts on the transition of the assembly from the load state into the relief state.

In a preferred embodiment, the installation surface of the friction ring extends at an installation angle and the contract surface of the synchronizer ring extends at a contact angle, in each case conically along the friction ring axis, with the installation angle and the contact angle differing in the relief state and with the installation angle corresponding to the contact angle in the load state. In the relief state, a minimal difference angle of up to 5° is thereby adopted between the installation surface and the contact surface. In the load state, in contrast, the installation angle and the contact angle are the same, i.e. the difference angle disappears in the load state. The contact surface of the synchronizer ring and/or the installation surface of the friction ring is/are tilted on the transition of the assembly from the relief state into the load state due to the difference angle between the installation surface and the contact surface in the relief state such that the installation angle adapts to the contact angle. It has been found that this embodiment of the assembly allows a particularly small adhesion between the friction ring and the synchronizer ring.

The installation angle can preferably, but not necessarily, be larger than the contact angle in the relief state.

In an embodiment very important for practice, the friction ring body of the friction ring is configured in the relief state such that the installation surface of the friction ring has a varying first radius of curvature in the peripheral direction, with the first radius of curvature of the installation surface being constant in the load state. The geometrical shape of the installation surface of the friction ring therefore differs from a circular shape in the relief state. The geometrical shape of the installation surface is, for example, formed as oval, as a rounded polygon, such as a rounded triangle, in the relief state. On the transition into the load state, the installation surface is elastically deformed such that the installation surface is adapted to the geometrical shape of the contact surface in the load state. This embodiment of the assembly also allows a particularly small adhesion between the friction ring and the synchronizer ring.

It has also been found to be advantageous for the friction ring and the synchronizer ring to consist of different materials. It is thus of advantage if the friction body is composed of a material having a low modulus of elasticity, e.g., a sheet metal, and if the synchronizer ring is composed of a material having a higher modulus of elasticity, e.g., brass. A good elastic deformation of the friction ring body on the transition from the relief state into the load state is ensured via such a material pairing. In addition, the adhesion between the friction ring and the synchronizer ring can be further reduced by the material pairing of sheet metal and brass since this has a small adhesion tendency.

The present invention further relates to a method of synchronizing a gear wheel of a variable ratio gear transmission by means of an assembly in accordance with the invention of a synchronization unit of the variable ratio gear transmission, wherein the assembly comprises: a friction ring that has a conical friction ring body having a friction surface and an installation surface that respectively bound the friction ring body in a peripheral direction extending perpendicular to an axial friction ring axis and a synchronizer ring having a contact surface directed toward the installation surface of the friction ring. The method comprises the following:

providing an assembly in accordance with embodiments of the invention;

displacing the synchronizer ring in the direction of the gear wheel to be synchronized during a load state of a synchronizing process, wherein the geometrical shape of the installation surface of the friction ring and the geometrical shape of the contact surface of the synchronizer ring are adapted to one another during the load state such that the contact surface of the synchronizer ring and the installation surface of the friction ring contact one another in a shape-matched manner and the friction surface of the friction ring is brought into friction contact with the gear wheel in the peripheral direction; and moving away the synchronizer ring from the gear wheel to be synchronized during a relief state of the synchronizing process, wherein the geometrical shape of the installation surface of the friction ring or the geometrical shape of the contact surface of the synchronizer ring is deformed during the relief state such that the geometrical shape of the installation surface of the friction ring and the geometrical shape of the contact surface of the synchronizer ring differ from one another.

In an embodiment very important for practice, the geometrical shape of the installation surface of the friction ring is adapted to the geometrical shape of the contact surface of the synchronizer ring during the load state and the geometrical shape of the installation surface of the friction ring is deformed during the relief state such that the geometrical shape of the installation surface of the friction ring differs from the geometrical shape of the contact surface of the synchronizer ring.

Advantageously, the installation surface of the friction ring extends at an installation angle and the contact surface of the synchronizer ring extends at a contact angle, in each case conically along the friction ring axis, and the installation angle is adapted to the contact angle during the load state and the installation surface of the friction ring is deformed during the relief state such that the installation angle differs from the contact angle.

It is furthermore of advantage if the installation surface of the friction ring has a first radius of curvature in the peripheral direction and if the contact surface of the synchronizer ring has a second radius of curvature in the peripheral direction and if the first radius of curvature of the installation surface is adapted to the second radius of curvature of the contact surface during the load state and the installation surface of the friction ring is deformed during the relief state such that the first radius of curvature of the installation surface differs from the second radius of curvature of the contact surface.

The invention additionally relates to a friction ring for an assembly, wherein the friction ring comprises a conical friction ring body having a friction surface and an installation surface that respectively bound the friction ring body in a peripheral direction extending perpendicular to an axial friction ring axis.

In accordance with the invention, the friction ring body is configured such that the installation surface of the friction ring has a varying first radius of curvature in the peripheral direction.

The friction ring body can preferably, but not necessarily, have a separation point in the peripheral direction, i.e. the friction ring body is configured as a ring having an interruption.

It has also been found to be advantageous for the friction ring to consist of sheet metal. A good elastic deformation of the friction ring is hereby ensured.

The invention furthermore relates to a synchronization unit for a variable ratio gear transmission having an assembly in accordance with the invention in accordance with the claims and to a variable ratio gear transmission for a vehicle having an assembly in accordance with the claims.

BRIEF DESCRIPTION OF THE DRAWINGS

Further advantages, features and details of the invention result with reference to the following description of embodiments and with reference to drawings in which elements which are the same or have the same function are provided with identical reference numerals.

There are shown.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
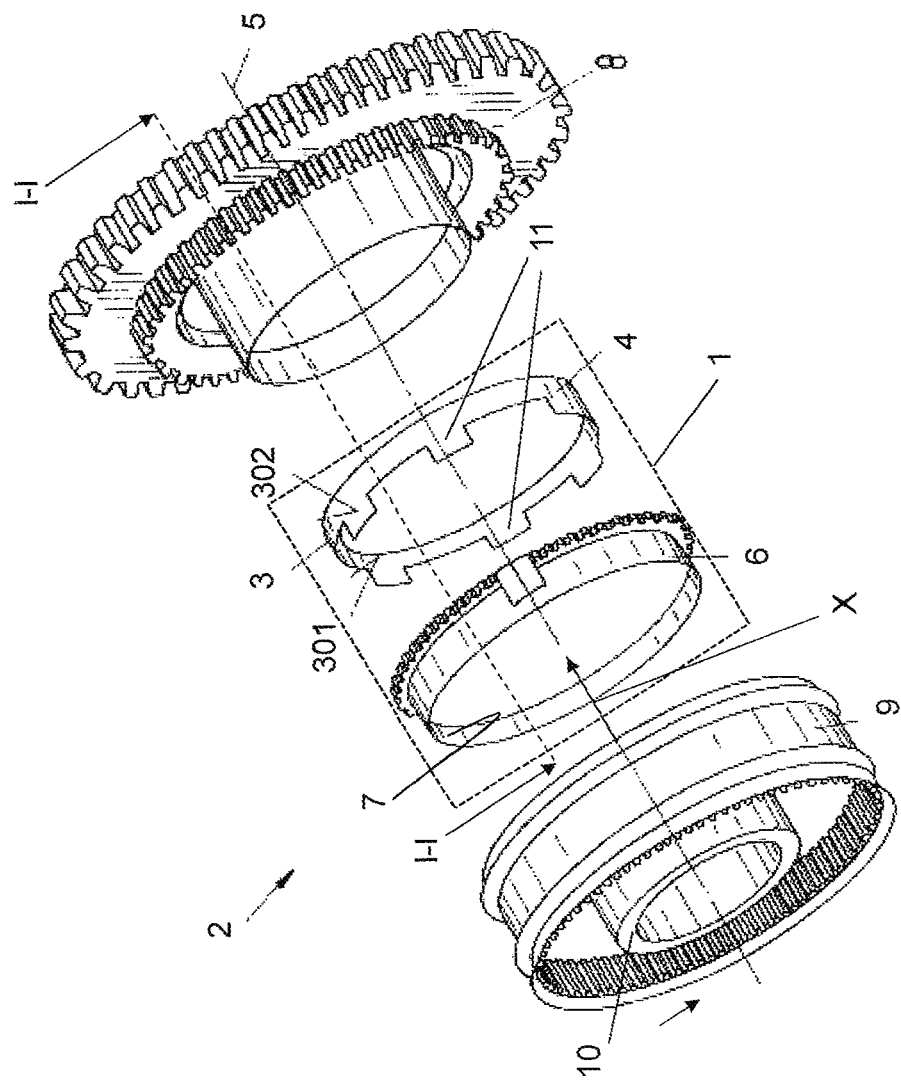
FIG. 1 a synchronization unit with an assembly of friction ring and synchronizer ring.

FIG. 1 shows in a schematic representation a synchronizing unit 2 having an assembly 1 comprising a friction ring 4 and a synchronizer ring 6. The synchronizing unit 2 furthermore has, in addition to the assembly 1, in a manner known per se a sliding coupling 9 having a synchronizer body 10 and a gear wheel 8, wherein the aforesaid components are arranged coaxially with respect to a friction ring axis 5 such that the synchronizer ring 6 is displaceable by the sliding coupling 9 together with the friction ring 4 along the friction ring axis 5 in the direction toward the gear wheel 8 during the synchronization process such that the friction ring 4 can be brought into engagement with the gear wheel 4.

The friction ring 4 comprises a conical friction ring body 3 having an inner friction surface 301 and an outer installation surface 302 which respectively bound the friction ring body 3 in a radial peripheral direction U extending perpendicular to an axial friction ring axis 5. Securities against rotation 11 are provided at the friction ring body 3 that extend along the friction ring axis 5 and that prevent a rotation of the friction ring 4 in the operating state.

A friction coating, not shown explicitly, can be provided at the inner friction surface 301, in particular a friction coating in the form of a carbon friction layer that can inter alia serve to at least partly compensate a resulting high mechanical and/or thermal load of the friction pairing.

The friction ring body 3 in the assembly unit 1 in accordance with FIG. 1 is closed in the peripheral direction U. It is, however, also possible that the friction ring body 3 has a separation point in the peripheral direction U, i.e. is designed as a slit ring body 3.

The synchronizer ring 6 has a contact surface 7 directed toward the installation surface 302 of the friction ring 4 and has coupling pockets, not shown in any more detail, for receiving the securities against rotation 11 of the friction ring 4.

In the assembly 1 in accordance with FIG. 1, the friction ring 4 and the synchronizer ring 6 comprise different materials. The friction ring body 3 is thus produced from a sheet metal and the synchronizer ring 6 from brass.

Figure 2A:
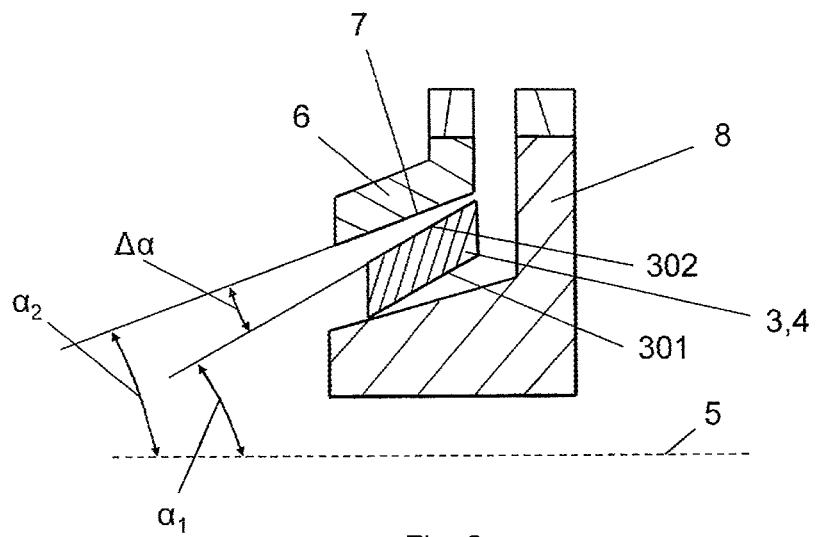
FIG. 2a a section along the line I-I in accordance with FIG. 1 through a first embodiment of an assembly in accordance with the invention that is in a relief state of a synchronizing process.
Figure 2B:
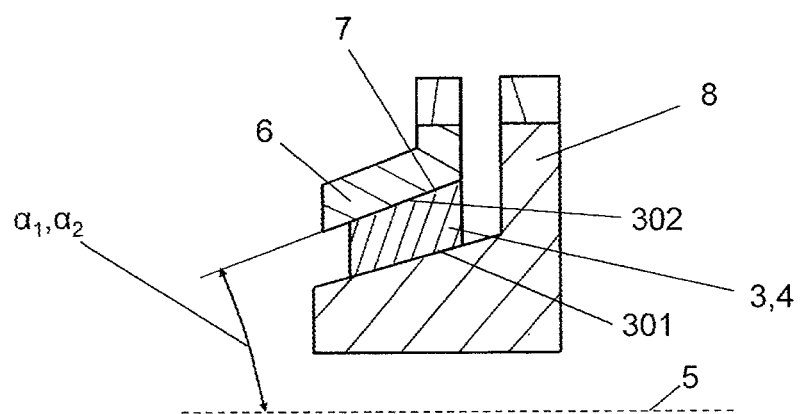
FIG. 2b a section along the line I-I in accordance with FIG. 1 through a first embodiment of an assembly in accordance with the invention that is in a load state of a synchronizing process.

In accordance with a first embodiment of an assembly 1 in accordance with the invention in accordance with FIGS. 2a and 2b, the installation surface 302 of the friction ring 4 extends at an installation angle $\alpha_1$ and the contact surface 7 of the synchronizer ring 6 extends at a contact angle $\alpha_2$, in each case conically along the friction ring axis 5.

FIG. 2a shows the assembly 1 in the relief state of the synchronizing process in which the synchronizer ring 6 is moved away from the gear wheel 8 to be synchronized. The installation angle $\alpha_1$ and the contact angle $\alpha_2$ are different in the relief state such that a minimal difference angle $\Delta\alpha$ is adopted between the installation surface 302 and the contact surface 7 in the relief state; it is 3° in the embodiment. In the relief state, the contact surface 7 and the installation surface 302 are substantially released from one another in the peripheral direction U due to the difference angle $\Delta\alpha$. In the embodiment shown, the installation angle $\alpha_1$ is larger than the contact angle $\alpha_2$ in the relief state.

In the described embodiment, the installation surface 302 of the friction ring 4 is elastically deformable. If now the assembly 1 is transitioned from the relief state into the load state, the installation surface 302 of the friction ring 4 is tilted or elastically deformed by the contact surface 7 of the synchronizer ring 6 by so much until the installation angle $\alpha_1$ has adapted to the contact angle $\alpha_2$. The installation surface 302 hereby undergoes a preload.

FIG. 2b shows the assembly 1 in the load state of the synchronizing process. The synchronizer ring 6 is in this respect displaced in the direction of the gear wheel 8 to be synchronized such that the contact surface 7 of the synchronizer ring 6 contacts the installation surface 302 of the friction ring 4, whereby a friction contact arises between the friction surface 301 and the gear wheel 8 and a speed of revolution matching takes place between the gear wheel 8 and the friction ring 4 and thus the synchronizer ring 6. The installation angle $\alpha_1$ and the contact angle $\alpha_2$ are the same in the load state such that the difference angle $\Delta\alpha$ disappears in the load state.

The installation surface 302 of the friction ring 4 returns into its original load-free state again on the transition of the assembly 1 from the load state into the relief state due to its elastic deformation or preload such that the difference angle $\Delta\alpha$ is again adopted between the installation surface 302 of the friction ring 4 and the contact surface 7 of the synchronizer ring 6 in the relief state.

On the transition of the assembly 1 from the load state into the relief state, some of the adhesion force that acts between the installation surface 302 and the contact surface 7 is overcome by a restoring force of the installation surface 302 of the friction ring 4. The restoring force of the installation surface 302 thus supports the release of the installation surface 302 from the contract surface 7 on the transition from the assembly 1 from the load state into the relief state.

Figure 3A:
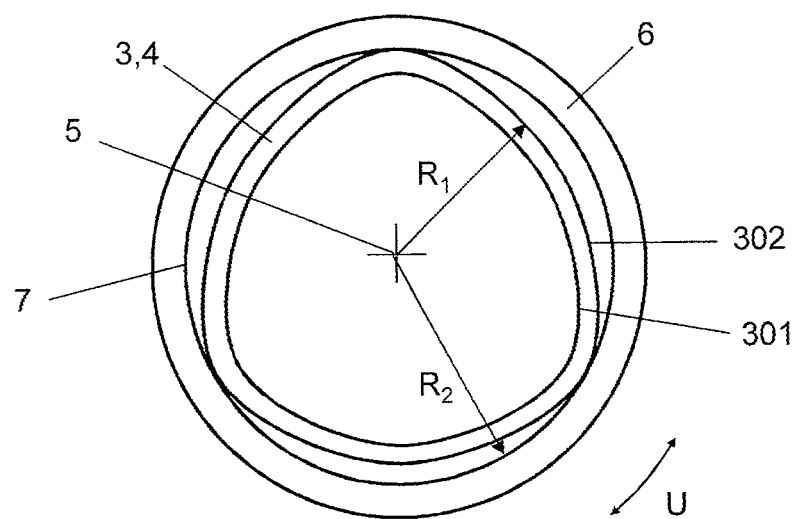
FIG. 3a a part side view X in accordance with FIG. 1 of a second embodiment of an assembly in accordance with the invention that is in a relief state of a synchronizing process.
Figure 3B:
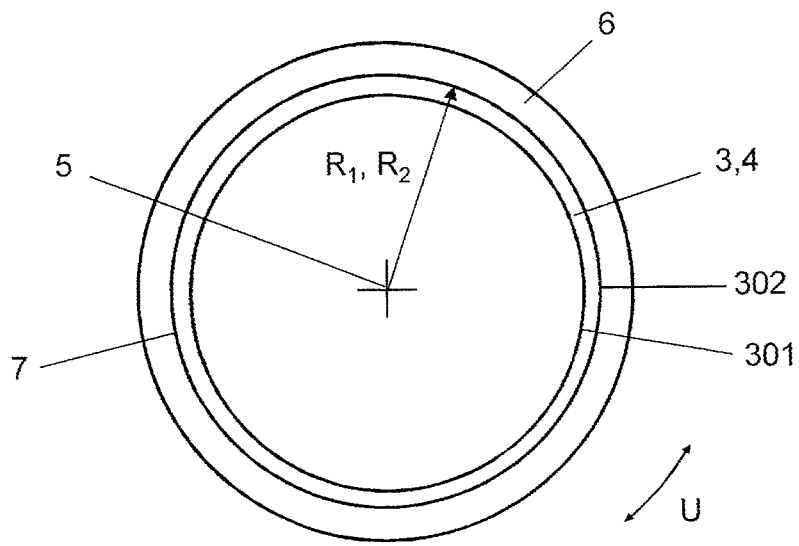
FIG. 3b a part side view X in accordance with FIG. 1 of a second embodiment of an assembly in accordance with the invention that is in a load state of a synchronizing process.

FIG. 3a and FIG. 3b show a side view X in accordance with FIG. 1 of a second embodiment of an assembly 1 in accordance with the invention in which the friction body 3 of the friction ring 4 is configured in the relief state such that the installation surface 302 of the friction ring 4 has a varying first radius of curvature $R_1$ in the peripheral direction U.

FIG. 3a shows the assembly 1 in the relief state of the synchronizing process in which the synchronizer ring 6 is moved away from the gear wheel 8 to be synchronized. The geometrical shape of the installation surface 302 of the friction ring 4 is configured as a rounded triangle in the relief state, i.e. the geometrical shape of the installation surface 302 differs from a circular shape in the relief state. The geometrical shape of the contact surface 7 of the synchronizer ring 6 is in contrast configured as circular such that the contact surface 7 has a constant second radius of curvature $R_2$ in the peripheral direction U. The contact surface 7 and the installation surface 302 are therefore substantially released from one another in the peripheral direction U in the relief state due to the different geometrical configuration.

The installation surface 302 of the friction ring 4 is also elastically deformable in this embodiment. If the assembly 1 is now transitioned from the relief state into the load state, the installation surface 302 is elastically deformed by the contact surface 7 of the synchronizer ring 6 by so much until the installation surface 302 has adapted to the geometrical shape of the contact surface 7 in the load state. The installation surface 302 hereby undergoes a preload.

FIG. 3b shows the assembly 1 in the load state of the synchronizing process. The synchronizer ring 6 is in this respect displaced in the direction of the gear wheel 8 to be synchronized such that the contact surface 7 of the synchronizer ring 6 contacts the installation surface 302 of the friction ring 4, whereby a friction contact arises between the friction surface 301 and the gear wheel 8 and a speed of revolution matching takes place between the gear wheel 8 and the friction ring 4 and thus the synchronizer ring 6. In the load state, the geometrical shape of the installation surface 302 is circular, i.e. the first radius of curvature $R_1$ of the installation surface 302 is likewise constant in the peripheral direction U in the load state.

The installation surface 302 of the friction ring 4 returns into its original, load-free state again on the transition of the assembly 1 from the load state into the relief state due to its elastic deformation. On the transition of the assembly 1 from the load state into the relief state, some of the adhesion force that acts between the installation surface 302 and the contact surface 7 is overcome by a restoring force of the installation surface 302 of the friction ring 4. The restoring force of the installation surface 302 thus supports the release of the installation surface 302 from the contract surface 7 on the transition from the assembly 1 from the load state into the relief state.

In the embodiment in accordance with FIGS. 3a and 3b, the geometrical shape of the installation surface 302 of the friction ring 4 is configured as a rounded triangle in the relief state. It is, however, also possible that the geometrical shape of the installation surface 302 differs from a circular shape of the contact surface 7 in a different geometrical manner in the relief state.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A synchronizer unit of a variable ratio gear transmission, said synchronizer unit comprising:
   a friction ring comprising:
   a first annular end arranged on a smaller diameter side;
   a second annular end arranged on a larger diameter side:
   a conical inner surface arranged between the first and second annular ends and extending at a first conical angle;
   a conical outer installation surface arranged between the first and second annular ends and being coaxial with the conical inner surface;
   a synchronizer ring comprising:
   a conical inner installation surface structured and arranged to, during gear synchronization, directly engage with the conical outer installation surface of the friction ring; and
   said conical inner installation surface being coaxial with the conical outer installation surface,
   wherein the friction ring is at least one of:
   a one-piece member that, in a relaxed state, assumes a first geometrical shape, that in a plane perpendicular to a center axis of the friction ring, having a varying, radius of curvature and that in a pre-loaded state, assumes a second geometrical shape different from the first geometrical shape;
   and a metal member that, in a relaxed state, assumes a first geometrical shape, that in a plane perpendicular to a center axis of the friction ring, having a varying radius of curvature and that in a pre-loaded state, assumes a second geometrical shape different from the first geometrical shape,
   wherein the conical outer installation surface has portions which are spaced from the conical inner installation surface when the friction ring assumes the first geometrical shape, and wherein the conical outer installation surface conforms to a shape of the conical inner installation surface when the friction ring assumes the second geometrical shape.

2. The unit of claim 1, wherein, in the relaxed state, the conical outer installation surface of the friction ring extends at a first conical angle that is different from a second conical angle of the conical inner installation surface of the synchronizer ring.

3. The unit of claim 2, wherein the first conical angle is larger than the second conical angle relative to a center axis of the friction ring.

4. The unit of claim 1, wherein the synchronizer ring further comprises:
   a conical outer surface;
   a first annular end arranged on a smaller diameter side;
   a second annular end arranged on larger diameter side; and
   teeth arranged on a radially projecting flange located at the larger diameter side.

5. The unit of claim 1, wherein the conical inner surface of the friction ring is adapted to be in contact with a gear wheel during a synchronization process in which the synchronizer ring is displaced.

6. The unit of claim 1, wherein the friction ring and the synchronizer ring comprise different materials.

7. The unit of claim 6, wherein the friction ring comprises sheet-metal and the synchronizer ring comprises brass.

8. A variable ratio gear transmission for a vehicle, comprising the unit of claim 1.

9. A method of making a variable ratio gear transmission for a vehicle, comprising assembling the unit of claim 1.

10. A method of using a variable ratio gear transmission for a vehicle, comprising moving the synchronizer ring of claim 1 toward a gear wheel to cause the friction ring to assume the pre-loaded state.

11. A synchronizer unit of a variable ratio gear transmission, said synchronizer unit comprising:
    a friction ring comprising:
    a first annular end arranged on a smaller diameter side;
    a second annular end arranged on a larger diameter side;
    a conical inner surface arranged between the first and second annular ends and extending at a first conical angle,
    a conical outer installation surface arranged between the first and second annular ends and being coaxial with the conical inner surface;
    a synchronizer ring comprising:
    a conical inner installation surface structured and arranged to, during gear synchronization, directly engage with the conical outer installation surface of the friction ring; and
    said conical inner installation surface being coaxial with the conical outer installation surface,
    wherein the friction ring is at least one of:
    a one-piece member that, in a relaxed state, assumes a rounded polygon geometrical shape and that in a pre-loaded state; assumes a circular geometrical shape; and
    a sheet-metal member that, in a relaxed state, assumes a rounded polygon geometrical shape and that in a pre-loaded state, assumes a circular geometrical shape,
    wherein the conical outer installation surface has portions which are spaced from the conical inner installation surface when the friction ring assumes the first rounded polygon geometrical shape, and
    wherein the conical outer installation surface conforms to a shape of the conical inner installation surface when the friction ring assumes the circular geometrical shape.

12. A variable ratio gear transmission for a vehicle, comprising the unit of claim 11.

13. A method of making a variable ratio gear transmission for a vehicle, comprising assembling the unit of claim 11.

14. A method of using a variable ratio gear transmission for a vehicle, comprising moving the synchronizer ring of claim 11 toward a gear wheel to cause the friction ring to assume the pre-loaded state.

15. A synchronizer unit of a variable ratio gear transmission, said synchronizer unit comprising:
   a friction ring comprising:
   first annular end arranged on a smaller diameter side;
   a second annular end arranged on a larger diameter side;
   a conical inner surface arranged between the first and second annular ends and extending at a first conical angle;
   a conical outer installation surface arranged between the first and second annular ends and being coaxial with the conical inner surface;
   a synchronizer ring comprising:
   a conical inner installation surface structured and arranged to, during gear synchronization, directly engage with the conical outer installation surface of the friction ring; and
   said conical inner installation surface being coaxial with the conical outer installation surface,
   wherein the friction ring is a one-piece sheet-metal member that, in a relaxed state, assumes a non-circular geometrical shape and that in a pre-loaded state, assumes a circular geometrical shape,
   wherein the conical outer installation surface conforms to a shape of the conical inner installation surface when the friction ring assumes the circular geometrical shape, and
   wherein the non-circular geometrical shape is one of:
   oval;
   rounded polygon; or,
   rounded triangle.

16. A variable ratio gear transmission for a vehicle, comprising the unit of claim 15.

17. A method of making a variable ratio gear transmission for a vehicle, comprising assembling the unit of claim 15.

18. A method of using a variable ratio gear transmission for a vehicle, comprising moving the synchronizer ring of claim 15 toward a gear wheel to cause the friction ring to assume the pre-loaded state.

* * * * *